Patented May 10, 1938

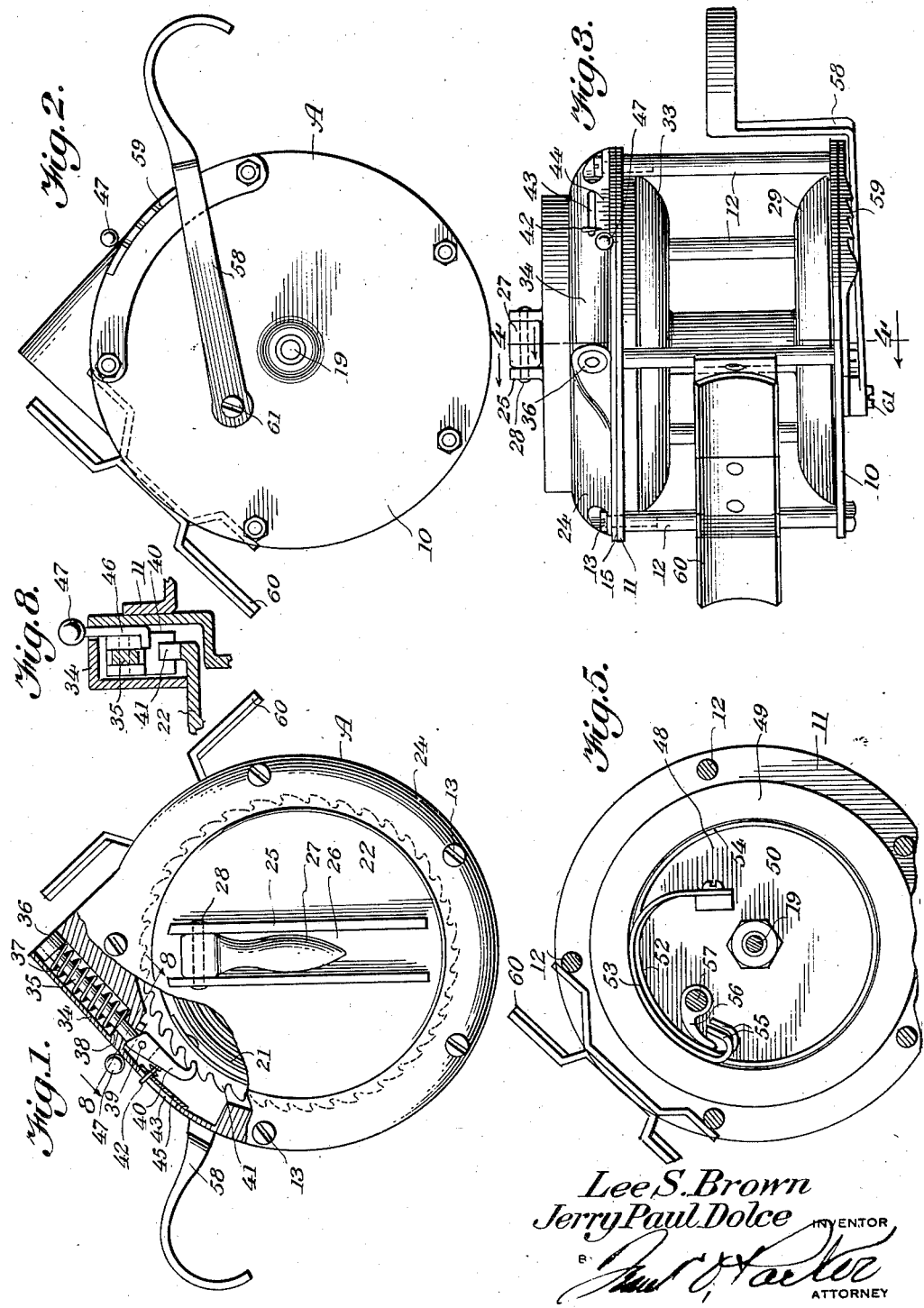

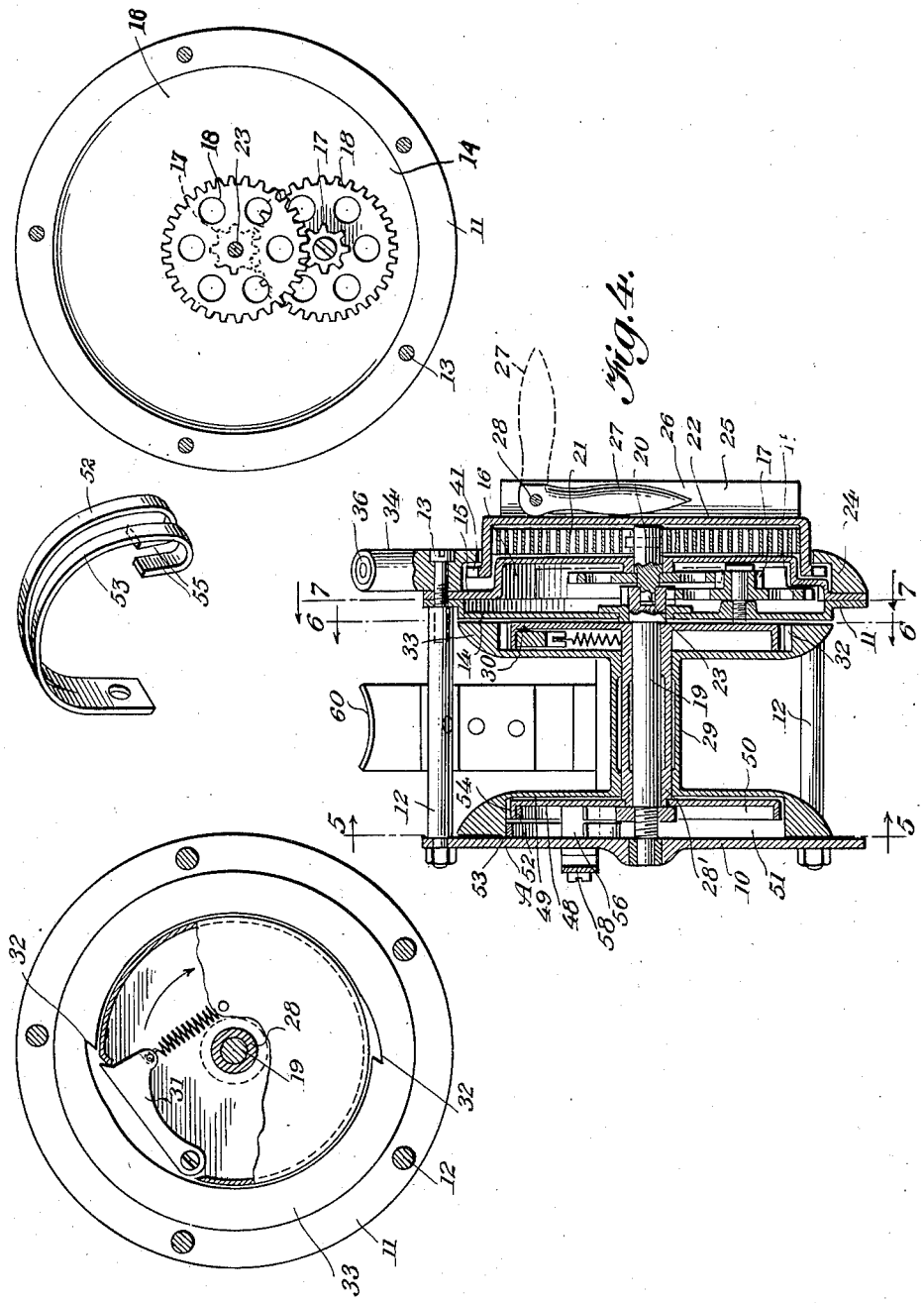

2,116,959

UNITED STATES PATENT OFFICE 2,116,959

PREWOUND CASTING REEL

Lee S. Brown and Jerry Paul Dolce, Worland, Wyo.

Application April 23, 1936, Serial No. 76,041

5 Claims. (Cl. 242—84.3)

The invention relates to finishing reels, and more especially to prewound casting reels for fishing lines.

The primary object of the invention is the provision of a reel of this character, wherein the spool for the winding and unwinding of a line is assembled in a novel manner so that said spool through a prewound coil spring will be automatically rotated for the winding of the line thereon after casting, the spool being freed during the casting of the line and such reel is novel in assembly and construction in its entirety.

Another object of the invention is the provision of a reel of this character, wherein through the instrumentality of an indicator it can be ascertained the amount of tension upon the prewound spring which effects the automatic winding of the line upon the spool of the reel.

A further object of the invention is the provision of a reel of this character, wherein a novel form of brake mechanism is arranged within the reel for controlling the action of the spool in the automatic winding of the line thereon under the influence of the prewound spring associated with the said reel.

A still further object of the invention is the provision of a reel of this character, which is simple in construction, thoroughly reliable and efficient in operation, strong, durable, readily and easily handled, possessed of a folding handle which is out of the way when not in use, and inexpensive to manufacture.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a side elevation partly in section of the reel constructed in accordance with the invention.

Figure 2 is a side elevation of the reel looking at the opposite side from that in Figure 1.

Figure 3 is a top plan view.

Figure 4 is a sectional view on the line 4—4 of Figure 3.

Figure 5 is a vertical sectional view through the reel.

Figure 6 is a sectional view on the line 6—6 of Figure 4 looking in the direction of the arrows.

Figure 7 is a sectional view on the line 7—7 of of Figure 4 looking in the direction of the arrow.

Figure 8 is a fragmentary sectional view taken on the line 8—8 of Figure 1 looking in the direction of the arrows.

Figure 9 is a detail perspective view of the double leaf spring of the brake device.

Similar reference characters indicate corresponding parts throughout the several views in the drawings.

Referring to the drawings in detail the reel in the preferred construction comprises a frame A having spaced side cheeks or plates 10 and 11, respectively, between which are located spacer rods 12, these being close to the peripheries of said cheeks or plates and are made secure by suitable fasteners 13 to give strength and rigidity to the said frame.

The cheek or plate 11 is provided with an inset circular center portion 14 confronted by an outstruck cover plate 15 which is secured in place by the fasteners 13 so that a chamber 16 is provided between said plates 11 and 15. In this chamber 16 is arranged a train of enmeshing gears and pinions 17 and 18, respectively, connected with an axle 19 journaled centrally in the plates 10 and 11 of the frame A and a driving arbor 20 for a coiled main spring 21 held within a circular winding head 22, the arbor 20 being journaled in the plate 15 and stud swiveled at 23 in the axle 19 at its end next to said arbor.

The head 22 rotatably fits within a stationary rim 24 concentrically thereof on the cover plate 15, while provided exteriorly on this head 22 are spaced crosswise arranged ribs 25 forming therebetween a channel seat 26 for a foldable handle 27 which is mounted upon a pivot 28 engaged in said ribs 25, the handle being for the purpose of turning the head 22 to manually wind the spring 21 in an easy and convenient manner. The handle 27 when folded into the seat 26 when not in use will be out of the way.

Upon the axle 19 between the cheeks or plates 10 and 11 is fixed an inner braking and clutching spool 28' upon which is loosely carried an outer winding and unwinding line spool 29. The end 30 of the spool 28' has pivoted thereto a spring released centrifugally acting latching dog or pawl 31 for engaging in ratchet notches 32 formed internally in the end 33 of the spool 29 next to the said end 30, so that the said spool 29 will be driven through the spool 28' when this dog or pawl 31 is engaged in either notch 32 by the main winding spring 21 when wound, whereby automatic winding of a line upon the reel 29 will be had.

Formed with the rim 24 and tangentially disposed with respect to the periphery of the head 22 is a tube formation 34 in which is arranged a plunger 35 having at its outer end a removable nut 36 against which is seated a coiled spring 37, the latter surrounding said plunger and is seated at its inner end against a shoulder 38 within the barrel formation 34 to exert tension on said plunger. The plunger 35 at its inner end has pivoted thereto at 39 a ratchet dog 40 which engages with ratchet teeth 41 formed at the periphery of the head 22 for the latching of the latter on the winding of the main spring 21 during the turning of the said head.

This dog 40 is fitted with an indicator or pointer 42 which plays through a slot 43 in the outer portion of the rim 24 and along side of this slot 43 is a graduated scale 44 indicative of pounds pressure so that the indicator or pointer 42 cooperating with this scale 44 will show the tension of the spring 21 under the winding of the same. Covering this slot 43 interiorly of the rim 24 is a shield piece 45 which moves with the indicator or pointer and serves to exclude dust and dirt from entering said slot when the piece 45 is in closing position.

At the pivoted end of the dog 40 is a trip member 46 which extends through a suitable clearance exteriorly of the barrel and is formed outside thereof with a ball terminal or finger hold 47 so that the dog 40 may be manually released from the ratchet teeth 41 on the head 22 to permit the main spring 21 to unwind itself.

The ends 48 and 49 of the spools 28' and 29, respectively, are recessed or countersunk as at 50 and 51, respectively, to accommodate a brake device comprising a double leaf spring shoe fixed to the plate 10, the leaves being indicated at 52 and 53, respectively, which are normally offset with relation to each other, so that the leaf 52 bears against a flange 54 on the end 48 while the leaf 53 bears against the spool 29, so that both spools 28' and 29 will be held fast against rotation until tension of the leaves 52 and 53 has been relieved. Formed at the free ends of the leaves 52 and 53 are hook-like terminals 55, these being acted upon by a jaw 56, for action on both of the said leaves 52 and 53 which are differently located with respect to each other so that the leaf 53 will be moved in advance of the leaf 52 in conformity therewith and thus the spool 29 is the first to be freed by the brake device, then in sequence the spool 28' is the next freed by the latter. When the spool 29 is freed casting of the line can be had under free wheeling of said spool.

The jaw 56 is fixed to a turning stud 57 journaled in the plate 10 of the frame A, while outside of the latter and secured to this stud 57 is a finger engaging lever 58 which is adapted for springing engagement with a toothed keeper rack 59 stationarily held in place by the fasteners for certain of the rods 12 at the periphery of the plate 10, so that by adjustment of the lever 58 variable braking action may be had on the spools 28' and 29 by the brake device.

Two of the rods 12 have fitted therewith a bracket 60 by which the frame A can be supported on a fishing pole or rod as is usual in the carrying of the reel thereon.

The ends of the spool 29 are located close to the plates 10 and 11 of the frame A and are peripherally rounded in an outward direction at their inner faces so that the fishing line will not work between the ends of the spool 29 and the cheeks of the plates 10 and 11 of the said frame A.

The lever 58 is fixed at 61 next to the plate 10 of the frame A so that when the reel is carried on a rod the said lever will be in convenient reach of a finger of the operator without releasing grip of the rod by the hand for the actuation of the lever 58 for braking purposes. When braking action is relieved from the spool 29 it is liberated for free rotation and on releasing the spool 28' under the tension of the main spring after prewinding of the same automatic winding of the fishing line upon the spool 29 will take place. In the operation of the reel the line spool 29 is set free by actuating the lever 58 in one direction so that the leaf 53 of the brake device is relieved from bearing on the said spool 29 and thus free wheeling of the latter is had for line casting. Now when it is desired to retrieve the line for winding on the spool 29 the leaf 52 on further movement of the lever 58 will be disengaged from the flange 54 on the spool 28' and the dog or pawl 31 will engage with either notch 32 thus locking both spools 28' and 29 together. Through the pinion and gear connections 17 and 18 between the spool 28' and main spring 21 there will be a positive driving of the line spool 29 for the winding of the line thereon. When complete winding of the line is effected the lever 58 is released from the rack 59 and the spring leaves of the braking device again engage the spools 28' and 29 to hold the same fast.

It is of course to be understood that changes, variations and modifications may be made in the invention as come properly within the scope of the appended claims without departing from the spirit of the invention or sacrificing any of its advantages.

From the foregoing it is thought that the construction and manner of operation of the invention will be clearly understood and therefore a more extended explanation has been omitted.

What is claimed is:—

1. A reel of the kind described, comprising a supporting frame, spools concentrically journaled in the frame for independent rotation with respect to each other, means for connecting the spools for rotation in one direction, a braking device supported by the frame and having tensioning leaves for engaging the respective spools and normally braking the same, and manually actuated means for operating the braking device and effecting successive releasing and braking of said spools.

2. A reel of the kind described, comprising a supporting frame, spools concentrically journaled in the frame for independent rotation with respect to each other, means for connecting the spools for rotation in one direction, a braking device supported by the frame and having tensioning leaves for engaging the respective spools and normally braking the same, manually actuated means for operating the braking device and effecting successive releasing and braking of said spools, and a prewound main spring for driving one of the spools.

3. A reel of the kind described, comprising a supporting frame, spools concentrically journaled in the frame for independent rotation with respect to each other, a braking device supported by the frame and having tensioning leaves for engaging the respective spools and normally braking the same, manually actuated means for operating the braking device and effecting successive releasing and braking of said spools, a prewound main spring for driving one of the spools, and a centrifugally operated ratchet acting latching means for locking the spools together on the turning in one direction of the main spring driven spool.

4. A reel of the kind described, comprising a supporting frame, spools concentrically journaled in the frame for independent rotation with respect to each other, a braking device supported by the frame and having tensioning leaves for engaging the respective spools and normally braking the same, manually actuated means for operating the braking device and effecting successive releasing and braking of said spools, a prewound main spring for driving one of the spools, a centrifugally operated ratchet acting latching means for locking the spools together on the turning in one direction of the main spring driven spool, and means for indicating the tension on the main spring on the winding of the same.

5. A reel of the kind described, comprising a supporting frame, spools concentrically journaled in the frame for independent rotation with respect to each other, a braking device supported by the frame and having tensioning leaves for engaging the respective spools and normally braking the same, manually actuated means for operating the braking device and effecting successive releasing and braking of said spools, a prewound main spring for driving one of the spools, a centrifugally operated ratchet acting latching means for locking the spools together on the turning in one direction of the main spring driven spool, means for indicating the tension on the main spring on the winding of the same, and means cooperating with said last named means for holding the main spring wound.

LEE S. BROWN.
JERRY PAUL DOLCE.